United States Patent [19]

Pouzoullic

[11] Patent Number: 5,550,461
[45] Date of Patent: Aug. 27, 1996

[54] SYSTEM FOR OPERATING A PLURALITY OF POWER SUPPLY MODULES IN PARALLEL

[75] Inventor: Gérard Pouzoullic, Gif Sur Yvette, France

[73] Assignee: Lucent Technologies Inc., Murray Hill, N.J.

[21] Appl. No.: 156,490

[22] Filed: Nov. 23, 1993

[30] Foreign Application Priority Data

Nov. 25, 1992 [FR] France .................... 9214189

[51] Int. Cl.$^6$ .......................................... G06F 1/614
[52] U.S. Cl. .................... 323/269; 323/274; 323/280; 323/350
[58] Field of Search .................... 323/268, 269, 323/273, 274, 280, 350

[56] References Cited

U.S. PATENT DOCUMENTS 4,628,433  12/1986  Notohamiprodjo .................. 363/65
4,658,201   4/1987  Notohamiprodjo .................. 323/224

FOREIGN PATENT DOCUMENTS 64-23724  1/1989  Japan.

*Primary Examiner*—Peter S. Wong
*Assistant Examiner*—Y. Jessica Han
*Attorney, Agent, or Firm*—Christopher N. Malvone

[57] ABSTRACT

The power supply modules, together feeding a load (between the terminals 13 and 12) with the voltage $V_0$, comprise blocking diodes $D_1$ (or $D_2$). A feedback loop controls the output voltage (controller 14 and comparator 15 which receives $V_{ref1}$ (or $V_{ref2}$)). Two output voltage terminals are used for locking, on the two electrodes of $D_1$, the voltages $V_1$ and $V_0$ (or $D_2$ with the voltage $V_2$ and $V_0$), and are connected to inputs of output voltage selection means (31) which are suitable to supply either the voltage $kV_0$ ($k \leq 1$) when $D_1$ (or $D_2$) is conductive, or the voltage $kV_1 = V_{ref1}$ (or $kV_2 = V_{ref2}$) when $D_1$ (or $D_2$) is blocked.

12 Claims, 3 Drawing Sheets

SYSTEM FOR OPERATING A PLURALITY OF POWER SUPPLY MODULES IN PARALLEL

FIELD OF THE INVENTION

The invention relates to a system comprising at least two power supply modules which together feed a load with a DC supply voltage $V_0$, and which are connected in a redundant configuration, and are coupled to one another via blocking diodes $D_1$, $D_2$ whose cathode carries the voltage $V_0$, each module comprises a feedback loop for its output voltage, which loop includes a voltage controller and a comparator whose positive input receives a reference voltage $V_{ref1}$ (or $V_{ref2}$), each module also comprises, in order to realize the feedback, two output voltage terminals, one of which is provided on the anode and the other on the cathode of its blocking diode $D_1$ (or $D_2$).

BACKGROUND OF THE INVENTION

An electric load is customarily supplied with a constant voltage by an electric power supply module. The power supply module often has to act as a voltage source. In practice the power supply module supplies the load with a DC voltage $V_0$ which is maintained constant by means of a feedback loop.

It is often desirable to neutralize a failure of this power supply module by utilizing at least one second power supply module which is identical and mounted in a redundant configuration, i.e. in this case mounted in parallel, with the first power supply module, with respect to the load.

In the latter situation, assuming that two power supply modules are used, it is necessary to prevent unbalanced operation of these two modules from disturbing the supply voltage for the load and from aggravating the unbalanced operation of the modules. Notably when one of the modules is deactivated, accidentally or voluntarily, the feeding of the load should not be disturbed, but remain ensured by the second module. This problem can be mitigated by connecting a diode, referred to as a blocking diode, to the output of each module, the cathode thereof being connected to the power supply input of the load which carries the voltage $V_0$. This step is known notably from the document JP-A-1-23724.

At this stage another problem occurs in respect of supplying the load with the DC voltage $V_0$. Actually, the two power supply modules are assumed to feed the load simultaneously, in the normal mode of operation, so that the feedback loop of each power supply module must be maintained; this is very difficult due to the fact that, the output of the modules being common, downstream from each blocking diode the two feedback loops influence one another to the extent that complex instability and inadmissible pumping phenomena can occur. Moreover, using such an arrangement, in the course of time one of the modules will inevitably feed the load substantially more than the other module, regardless of the precautions taken to ensure suitable symmetry of the construction and balanced control of the modules, each of which has its own reference voltage. One may reach the point where the power supply module with the smallest output, detecting an increasing voltage $V_0$ (due to the effect of the other module), reduces its voltage $V_1$, so as to lower $V_0$, until $V_1=V_0$, in which case the blocking diode $D_1$ is blocked and the voltage $V_1$ drops to 0, the feedback then being incapable of operating. Should subsequently the module with the largest output fail, the module with the smallest output will start to operate again but, as the voltage $V_1$ starts from the value 0, there will be a transitory operating phase during which the load is not fed. This transitory phase, even though it is brief, is not admissible. According to the cited document, these problems are solved by introducing, in parallel in the feedback loop, the output signal of a comparator for the anode voltages of the blocking diodes. It is a drawback of this solution that the feedback loops of the two power supply modules influence one another.

It is an object of the invention to provide a voltage source which includes a plurality of power supply modules which are connected in a redundant configuration and where deactivation (voluntary or accidental) of a power supply module does not cause transitory phenomena in feeding the load which affect the load or its operation, and each power supply module remains independent of the others.

SUMMARY OF THE INVENTION

In accordance with the invention this object is achieved and the drawbacks of the prior art are mitigated or eliminated due to the fact that the two output voltage terminals of each power supply module are connected to inputs of output voltage selection means suitable to supply a predetermined fraction (k) either of the cathode voltage of the blocking diode ($kV_0$) when the blocking diode, in the conductive state, carries a DC voltage $d_1$ ($d_2$), or of the anode voltage of the blocking diode ($kV_1=V_{ref1}$, or $kV_2=V_{ref2}$) when the blocking diode is blocked.

When the described construction is used, the system behaves well as a voltage source because always at least one power supply module implements its feedback on the basis of the voltage $V_0$ as the output voltage, and each power supply module remains independent from the other (others). The value of the supply voltage $V_0$ is imposed by the module whose reference (or imposed) voltage $V_{ref}$ is the highest, for example $V_{ref2}$. As the voltage $V_0$ increases subsequent to the increase of $V_{ref2}$, the feedback of the first module causes a decrease of the voltage $V_1$. When $V_0 \geq V_1$, the redundancy diode $D_1$ is blocked and the voltage $V_1$ is then controlled in proportion to the reference value $V_{ref1}$ (according to the same proportionality factor k of the control of the supply voltage $V_0$ ($V_0=kV_{ref1}$) before the blocking of the diode $D_1$).

The device thus prevents the converter whose reference voltage is highest (the second module in the present example) from causing the disappearance of the output voltage of the other module (the first module). If the second module, being the only one feeding the load in the present example, were to fail, in these circumstances, constantly a voltage $V_0$ could thus be available at the output, and the first module would directly take over from the second module, without a transitory phase of operation upon failure of the second module and the two modules nevertheless remaining independent from one another. The foregoing can be summarized as follows: the emergency change-over from one power supply module to another takes place without interrupting the supply voltage $V_0$; during the entire operation the voltage $V_0$ remains stable, regardless of the feeding (of the current supplied by one module or the other) and the temperature.

A preferred embodiment of the system of power supply modules in accordance with the invention is characterized in that for each power supply module said voltage selection means consist of a selection operational amplifier whose inverting input receives a fraction k of the anode voltage $V_1$ of the blocking diode, generated by a first resistance bridge, and whose non-inverting input receives the same fraction k of the cathode voltage $V_0$ of the blocking diode, generated by a second resistance bridge, the inverting input of said operational amplifier being connected to the output of the operational amplifier via a blocking diode connected in the forward direction.

Thus, when the diode $D_1$ is conductive, the selection operational amplifier outputs, at the point situated on the anode of the blocking diode, the voltage $kV_0$ present on the cathode of the blocking diode. When the diode $D_1$ is blocked, however, the same amplifier outputs, at the same point, the fixed voltage $kV_1$ which is imposed by the reference voltage $V_{ref1}$.

As has already been indicated, in redundant systems it is desirable to prevent the power supply module whose reference voltage is highest from delivering almost the entire power to the load.

To this end, a further embodiment of the invention which aims to equalize the currents through the diodes $D_1$ and $D_2$ of two power supply modules connected in a redundant configuration is characterized in that for each module a means for correcting the reference voltage $V_{ref1}$ (or $V_{ref2}$) are formed by a first selection operational amplifier whose inverting input is connected to its output and to the anode of its blocking diode $D_1$ (or $D_2$), via a first group of resistances, whose non-inverting input is connected to the anode of the blocking diode $D_2$ (or $D_1$) of the other module, and to the reference voltage $V_{ref1}$ (or $V_{ref2}$), via a second group of resistances, said selection operational amplifier being suitable to output the voltage: $V_{ref1}+k'(V_2-V_1)$ (or $V_{ref2}+k'(V_1-V_2)$), where $k' \leq 1$, and via at least a second operational amplifier, arranged subsequent to the first operational amplifier and conceived to supply, depending on whether the sign of the difference $V_2-V_1$ is negative or positive, either the voltage $V_{ref1}$ (or $V_{ref2}+k'(V_1-V_2)$) or the voltage $V_{ref1}+k'(V_2-V_1)$ (or $V_{ref2}$), these voltages constituting the new reference voltages.

When the currents supplied by two power supply modules are to be equalized, these currents are detected in known manner by way of the voltage generated thereby across the terminals of small resistances of the same value which are arranged in each power supply module, after which they are interlocked. According to the present improvement, use is made of the dynamic resistance of the diodes $D_1$ and $D_2$, i.e. during operation their DC voltages $d_1$, $d_2$ which are to be equalized by acting on the reference voltage of both power supply modules, at the positive input of the comparator. To this end, it is to be noted that the diodes $D_1$ and $D_2$ should be as identical as possible and that they should operate at the same temperature. Thus, an equalization of the currents of the order of 15% is achieved; even though this is less exact than according to the state of the art which utilizes resistances, it is nevertheless satisfactory in most cases.

The following description, given with reference to the attached drawings, by way of non-limitative examples, will illustrate how the invention can be carried out.

BRIEF DESCRIPTION OF THE DRAWINGS

Corresponding elements in the Figures are denoted by corresponding references.

DESCRIPTION OF PREFERRED EMBODIMENTS

Figure 1:
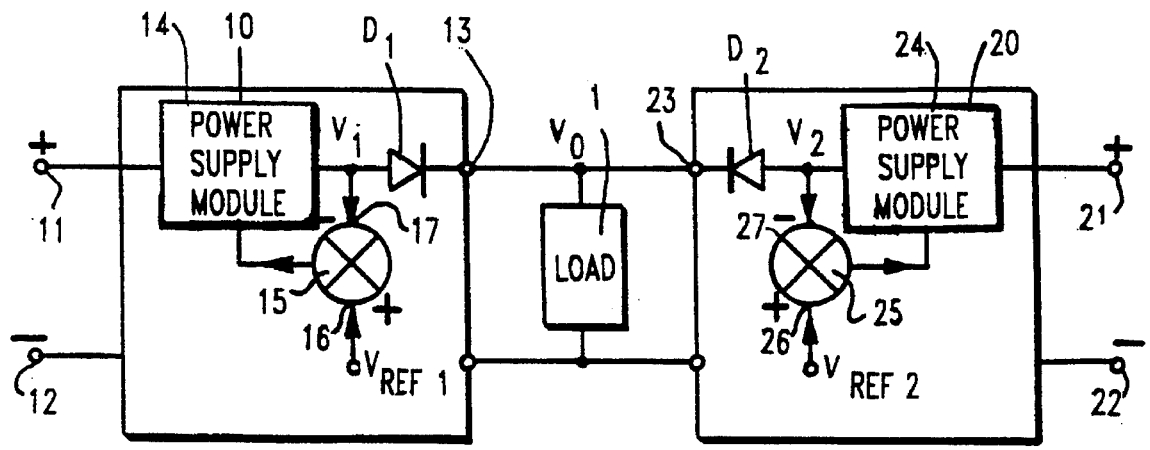
FIG. 1 shows a circuit diagram of a known system of power supply modules.

FIG. 1 shows an electric load 1 which is fed by two identical power supply modules 10 and 20, which themselves are fed between a positive voltage terminal 11 and a negative voltage terminal 12 (or 21, 22). The two power supply modules are connected parallel to the load 1, their coupling being realised via blocking diodes $D_1$ ($D_2$) whose cathode carries the supply voltage $V_0$ at terminals 13 (23). On the other hand, each power supply module comprises a conventional voltage controller 14 (24), for example of the pulse width modulation type (PWM). A feedback loop maintains the output voltage of the controller $V_1$ ($V_2$) at the anode of the diode $D_1$ ($D_2$) at a reference value $V_{ref1}$ ($V_{ref2}$). To this end, a comparator 15 (25) receives the reference voltage $V_{ref1}$ ($V_{ref2}$) at its positive input 16 (26) and the voltage $V_1$ or $V_2$ (or, generally speaking, a predetermined fraction of $V_1$ or $V_2$) at its negative input 17 (27), the difference voltage detected at the output of the comparator constituting the control voltage for the controller 14 (24). As a result of such a configuration, the feedback loops for the output voltage will not react to one another; however, it is not possible to achieve suitable control of the supply voltage $V_0$ in this manner, since the supply voltage $V_0$ can vary subsequent to a variation of the temperature of the diodes $D_1$ and $D_2$, for a given load, or vary from one load to another, in accordance with the impedance of the load and hence in dependence on the current across the diodes $D_1$ and $D_2$.

Figure 2:
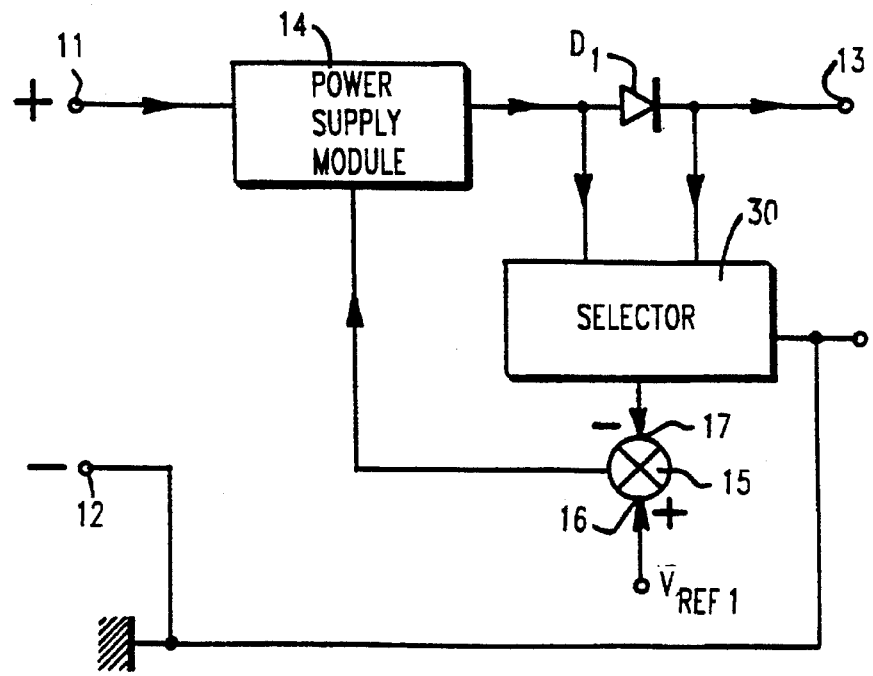
FIG. 2 shows a circuit diagram illustrating the operating principle of a system of power supply modules in accordance with the invention.

FIG. 2 shows a single power supply module of the system in redundant configuration in accordance with the invention, in which the described drawbacks are avoided. As in FIG. 1 for the first module, there are provided the input terminals 11 and 12, the voltage controller 14, the diode $D_1$ and the comparator 15 which receives the voltage $V_{ref1}$ at the positive input (additive) 16. In accordance with the invention, in order to realise the locking of its output voltage the power supply module comprises two output voltage terminals, one on the anode of the diode $D_1$, carrying the voltage $V_1$, and the other on the supply terminal 13, carrying the voltage $V_0$. These two voltages are applied to selection means 30 which receive the negative voltage at the terminal 12 in this case (ground which is also connected to the terminal of the load which does not receive the voltage $V_0$) and which apply a selection voltage to the negative (subtractive) input 17 of the comparator 15. This selection voltage consists of a predetermined fraction k (k<1) either of the cathode voltage of the diode $D_1$ when the diode $D_1$, in the conductive state, carries a DC voltage $d_1$, or of the anode voltage of the diode $D_1$ when the diode $D_1$ is blocked, i.e. either the voltage $kV_0$ or the voltage $kV_1$.

An embodiment based on operational amplifiers will be described in detail hereinafter with reference to FIG. 3 which, like FIG. 2, shows the first power supply module which is assumed to feed the load 1 (not shown) in parallel with one or more other power supply modules (not shown). The selection means 30, shown within the dash-dot box, consist of a selection operational amplifier 31 whose inverting input receives a fraction k of the anode voltage ($V_1$) of $D_1$, via a first resistance bridge 32, 33 (central point 34). For the sake of convenience, the value 0.5 is assigned to k, the resistances 32 and 33 having the value R. The non-inverting input of the amplifier 31 receives the same fraction k of the cathode voltage ($V_0$) of $D_1$, via a second resistance bridge 35, 36 (central point 37). The resistances 35 and 36 are also equal, so as to supply the same fraction k (k=0.5) of the detected voltage, and, for example also equal to R. The inverting input of the amplifier 31 is connected to the output of the amplifier 31 via blocking diode 38 which is connected in the forward direction and, via a point 39, to the non-inverting input of a follower operational amplifier 41 whose inverting input is fed back directly to its output, at a point 42.

During normal operation ($V_1-V_0=d_1$, $d_1>0$), the voltage at the point 34 tends to be slightly higher than that at the point 37. These two voltages are equalized to the value $V_0/2$ imposed by the point 37 by means of a small supplementary current which traverses the resistance 32 and the diode 38. The point 39 thus selects the voltage $V_0/2$. This voltage is applied, via the amplifier 41, to the negative input 17 of the comparator 15, the amplifier serving to provide impedance matching so as to supply the input 17 with a low impedance signal.

If the two voltages $V_0$ and $V1$ are equalized as the voltage $V_0$ increases (or the voltage $V_1$ decreases), the diode $D_1$ is blocked and the voltage at 37 is then slightly higher than the voltage at 34. Because of the blocking provided by the diode 38, the voltage 34, also being the voltage at the output 39, may not follow the voltage at the point 37 in these circumstances. The voltage 39 thus selects the voltage $V_1/2$ which is applied to the negative input of the comparator 15, via the amplifier 41. The voltage $V_1$ is thus stabilized to the blocking value of $V_0$, previously obtained upon the blocking of the diode $D_1$. If the voltage $V_0$ subsequently drops below said blocking value again, either slowly or abruptly, the diode $D_1$ immediately becomes conductive again.

Figure 3:
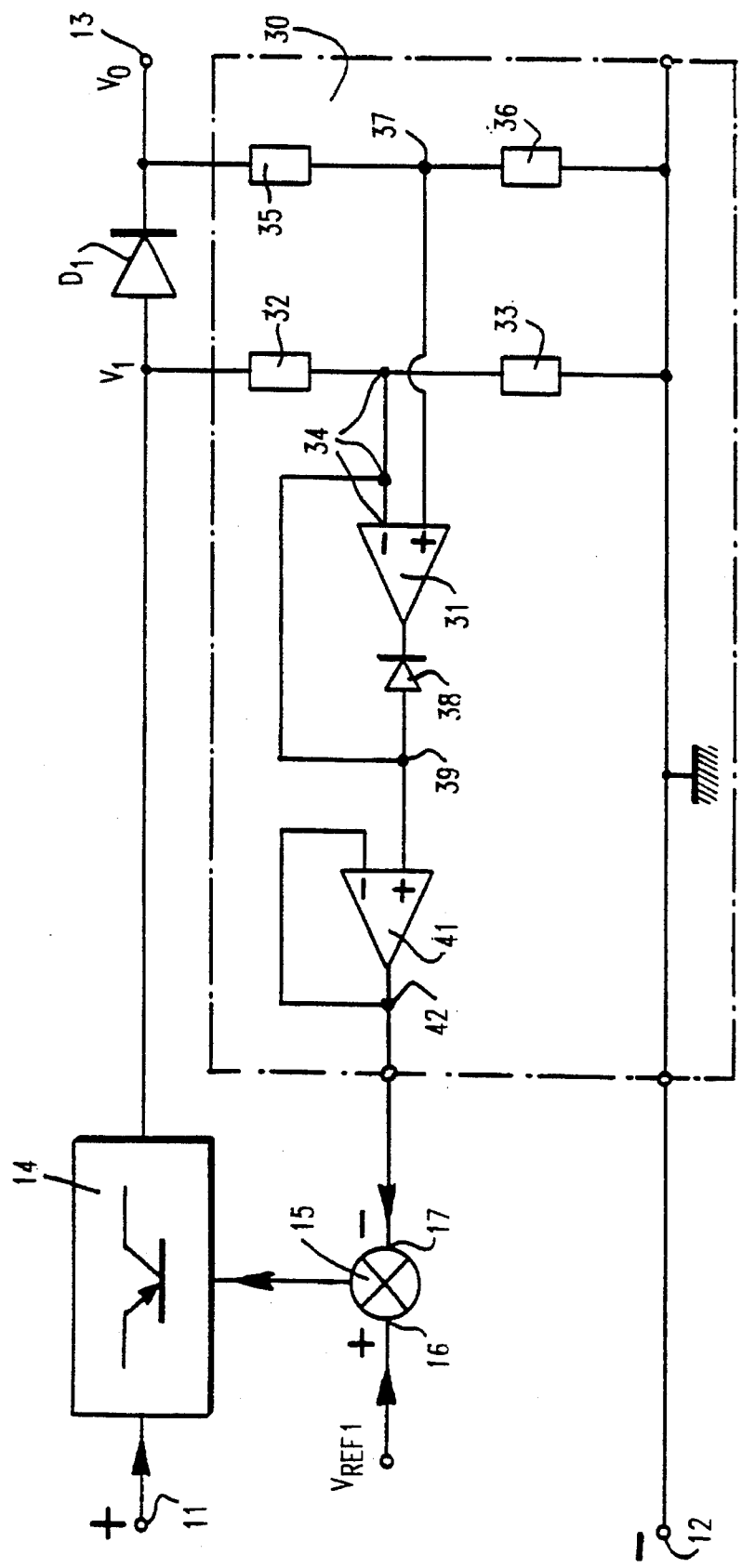
FIG. 3 shows a detailed diagram of a preferred embodiment of the system in accordance with the invention.
Figure 4:
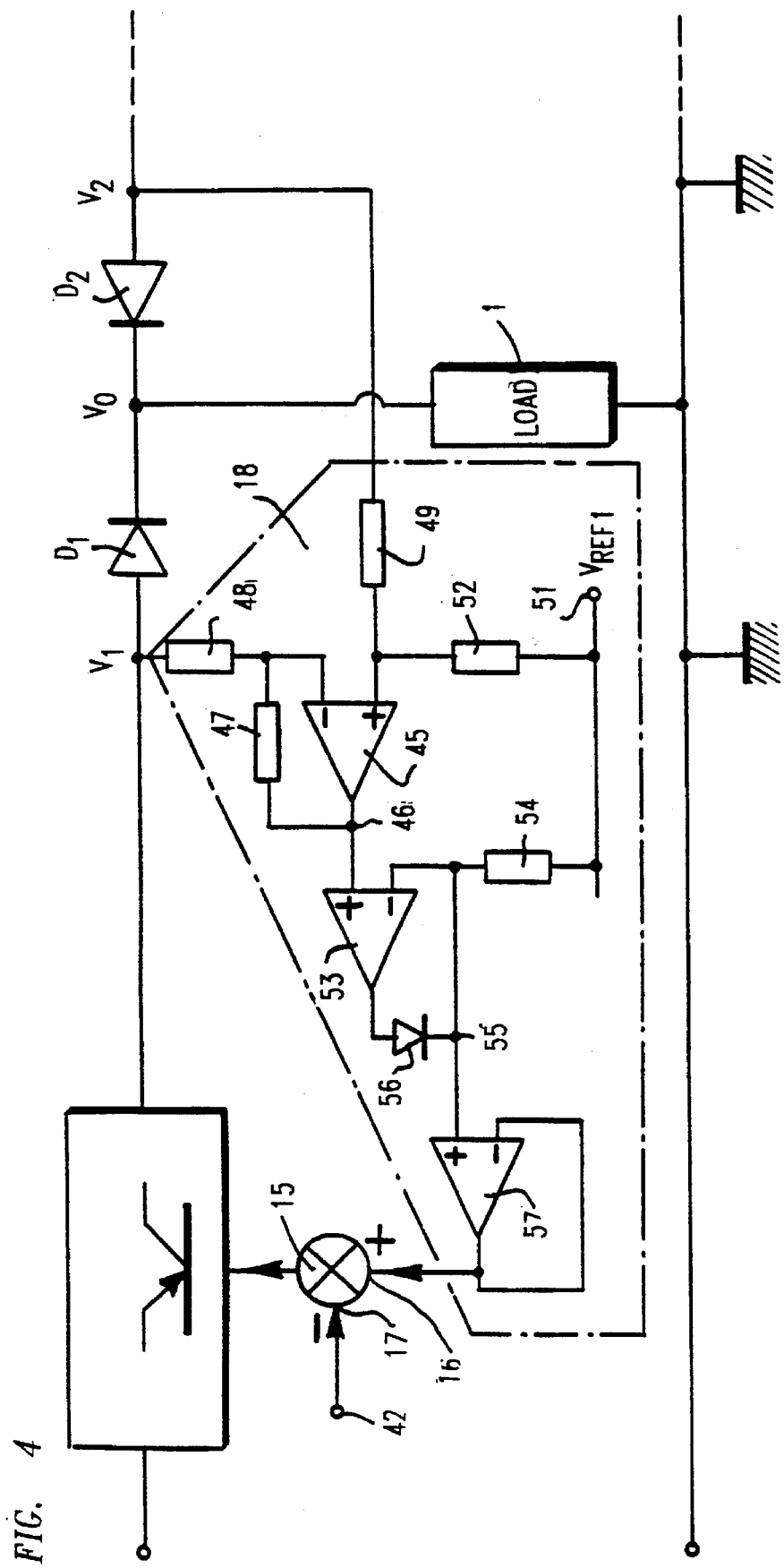
FIG. 4 shows the detailed diagram of a further improvement of the invention which aims to equalize supply currents applied to a load by two power supply modules.

If it is also desirable to render the currents traversing the diodes $D_1$ and $D_2$ of two power supply modules in a redundant configuration also substantially equal, the complementary device shown in FIG. 4 can be added to the system shown in the FIGS. 2 and 3. The complementary device constitutes means for correcting the reference voltage in each power supply module and, as for the FIGS. 2 and 3, the device is described hereinafter for the first power supply module in which it is denoted by the reference numeral 18 and enclosed by the dash-dot box. The correction means 18 comprise a first selection operational amplifier 45 whose inverting input is connected to its output, at the point 46, via a resistance 47, and to the anode of the diode $D_1$ (carrying the voltage $V_1$) via a resistance 48. The non-inverting input of the amplifier 45 is connected to the anode of the diode $D_2$ of the second power supply module, via a resistance 49, and to the reference voltage $V_{ref1}$, at the terminal 51, via a resistance 52. The values of the two groups of two resistances are chosen so that, for example the resistances 47 and 52 are equal to R' and the resistance 48 and 49 are equal to 2R'.

The non-inverting input of the amplifier 45 carries the voltage:

$$\frac{V_2 + 2V_{ref1}}{3}$$

which tends to be lower than the voltage $V_1$. The voltage at the inverting input overtakes, by way of higher values, those at the non-inverting input and the following voltage occurs at the output 46 of the amplifier 45:

$$V_{46} = \frac{V_2 - V_1}{2} + V_{ref1}$$

The point 46 is connected to the non-inverting input of a second operational amplifier 53 whose inverting input is connected on the one side to the terminal 51 (voltage $V_{ref1}$), via a resistance 54 (for example, of value R), and on the other side, via a point 55 and a diode 56 which is connected in the reverse direction, to its output.

When the voltage difference $V_2-V_1$ is positive, such a current appears across the diode 56 and the resistance 54 that the voltage at the point 55, initially being equal to $V_{ref1}$, overtakes, by lower values, that of the point 46, so $$\frac{V_2 - V_1}{2} + V_{ref1}$$

However, when $V_2$ is smaller than $V_1$, the inverting input controls the amplification, the diode 56 is blocked and the voltage at the point 55 is equal to $V_{ref1}$ (no current whatsoever traversing the resistance 54).

The voltage at the point 55 is applied, via a follower amplifier 57 for impedance matching, to the positive input 16 of the comparator 15 as a reference voltage. Moreover, the negative input 17 of the comparator 15 receives the voltage at the point 42 (see FIGS. 2 and 3), i.e. in this case the voltage $kV_0$, it being understood that, utilizing the equalization of the currents across the diodes $D_1$ and $D_2$, each power supply module always feeds the load (except in the case of failure), so that it can no longer be blocked by the other power supply module.

It is to be noted that, generally speaking, the voltage at the point 46 is equal to:

$$V_{46}=k'(V_2-V_1)+V_{ref1},$$

where k'<1. It will be evident to those skilled in the art that this value of k can be fixed by suitably choosing the values of the resistances 47, 48, 49, 52.

Only the first power supply module has been described with reference to FIG. 4. The second power supply module, only the blocking diode $D_2$ of which is shown in said Figure, has the same construction and, symmetrically, operates in the same way as the first power supply, module, utilizing an inversion of the functions of the voltages $V_1$ and $V_2$.

The embodiment of the invention described above with reference to FIG. 4 could operate alone, without locking to the supply voltage $V_0$. In that case steps can be taken to ensure that the voltage $kV_0$ at the point 42 is supplied via a single resistance bridge (not shown). However, the regularity of the voltage $V_0$ is controlled less in that case.

I claim:

1. A system, comprising at least two power supply modules which together feed a load with a DC supply voltage $V_0$, are connected in a redundant configuration, and are each coupled to the load via a respective blocking diode whose cathode carries the voltage $V_0$, each module comprising a feedback loop for its output voltage, which loop includes a voltage controller and a comparator whose positive input receives a respective reference voltage, each module also comprising, in order to realise said feedback, two output voltage terminals, one of which is provided on the anode and the other on the cathode of its respective blocking diode, which system is characterised in that the two output voltage terminals of each power supply module are connected to inputs of an output voltage selection means suitable to supply a predetermined fraction (k) of the cathode voltage of its respective blocking diode when its respective blocking diode is in the conductive state, and the predetermined fraction (k) of the anode voltage of its respective blocking diode when its respective blocking diode is blocked.

2. A power supply system as claimed in claim 1, characterized in that for each power supply module said voltage selection means comprises a selection operational amplifier whose inverting input receives a fraction k of the anode voltage of its respective blocking diode, generated by a first resistance bridge, and whose non-inverting input receives the same fraction k of the cathode voltage $V_0$ of its respective blocking diode, generated by a second resistance bridge, the inverting input of said operational amplifier being connected to the output of the operational amplifier via a blocking diode connected in the forward direction.

3. A power supply system as claimed in claim 2, characterized in that it comprises, downstream from said voltage selection means, a follower amplifier whose output is connected to the negative input of said comparator whose output controls said voltage controller.

4. A system comprising two power supply modules as claimed in claim 3, characterized in that in order to equalize currents across said respective blocking diodes, each module also comprises means for correcting its respective reference voltage so as to render its respective reference voltage slightly variable by addition of a portion of the difference between the anode voltages of the respective blocking diodes whenever the anode voltage of its respective blocking diode is less than the anode voltage of the other respective blocking diode.

5. A system comprising two power supply modules as claimed in claim 4, characterized in that for each module said means for correcting its respective reference voltage is formed by a first selection operational amplifier whose inverting input is connected to its output and to the anode of its respective blocking diode, via a first group of resistances, and whose non-inverting input is connected to the anode of the respective blocking diode of the other module, and to its respective reference voltage, via a second group of resistances, said selection operational amplifier providing an output voltage equal to its respective reference voltage plus a predetermined portion of the difference between the anode voltage of the respective blocking diode of the other module and the anode voltage of its respective blocking diode, and a second operational amplifier, arranged subsequent to the first operational amplifier and supplying an output voltage equal to, depending on whether the sign of the difference between the anode voltages of the respective blocking diodes is negative or positive, either its respective reference voltage or the output voltage provided by said selection operational amplifier, the output voltage of said second operational amplifier being a corrected reference voltage for the module.

6. A system comprising two power supply modules as claimed in claim 2, characterized in that in order to equalize currents across said respective blocking diodes, each module also comprises means for correcting its respective reference voltage so as to render its respective reference voltage slightly variable by addition of a portion of the difference between the anode voltages of the respective blocking diodes whenever the anode voltage of its respective blocking diode is less than the anode voltage of the other respective blocking diode.

7. A system comprising two power supply modules as claimed in claim 6, characterized in that for each module said means for correcting its respective reference voltage is formed by a first selection operational amplifier whose inverting input is connected to its output and to the anode of its respective blocking diode, via a first group of resistances, and whose non-inverting input is connected to the anode of the respective blocking diode of the other module, and to its respective reference voltage, via a second group of resistances, said selection operational amplifier providing an output voltage equal to its respective reference voltage plus a predetermined portion of the difference between the anode voltage of the respective blocking diode of the other module and the anode voltage of its respective blocking diode, and a second operational amplifier, arranged subsequent to the first operational amplifier and supplying an output voltage equal to, depending on whether the sign of the difference between the anode voltages of the respective blocking diodes is negative or positive, either its respective reference voltage or the output voltage provided by said selection operational amplifier, the output voltage of said second operational amplifier being a corrected reference voltage for the module.

8. A power supply system as claimed in claim 1, characterized in that it comprises, downstream from said voltage selection means, a follower amplifier whose output is connected to the negative input of said comparator whose output controls said voltage controller.

9. A system comprising two power supply modules as claimed in claim 8, characterized in that in order to equalize currents across said respective blocking diodes, each module also comprises means for correcting its respective reference voltage so as to render its respective reference voltage slightly variable by addition of a portion of the difference between the anode voltages of the respective blocking diodes whenever the anode voltage of its respective blocking diode is less than the anode voltage of the other respective blocking diode.

10. A system comprising two power supply modules as claimed in claim 9, characterized in that for each module said means for correcting its respective reference voltage is formed by a first selection operational amplifier whose inverting input is connected to its output and to the anode of its respective blocking diode, via a first group of resistances, and whose non-inverting input is connected to the anode of the respective blocking diode of the other module, and to its respective reference voltage, via a second group of resistances, said selection operational amplifier providing an output voltage equal to its respective reference voltage plus a predetermined portion of the difference between the anode voltage of the respective blocking diode of the other module and the anode voltage of its respective blocking diode, and a second operational amplifier, arranged subsequent to the first operational amplifier and supplying an output voltage equal to, depending on whether the sign of the difference between the anode voltages of the respective blocking diodes is negative or positive, either its respective reference voltage or the output voltage provided by said selection operational amplifier, the output voltage of said second operational amplifier being a corrected voltage for the module.

11. A system comprising two power supply modules as claimed in claim 1, characterized in that in order to equalize currents across said respective blocking diodes, each module also comprises means for correcting its respective reference voltage so as to render its respective reference voltage slightly variable by addition of a portion of the difference between the anode voltages of the respective blocking diodes whenever the anode voltage of its respective blocking diode is less than the anode voltage of the other respective blocking diode.

12. A system comprising two power supply modules as claimed in claim 11, characterized in that for each module said means for correcting its respective reference voltage is formed by a first selection operational amplifier whose inverting input is connected to its output and to the anode of its respective blocking diode, via a first group of resistances, and whose non-inverting input is connected to the anode of the respective blocking diode of the other module, and to its respective reference voltage, via a second group of resistances, said selection operational amplifier providing an output voltage equal to its respective reference voltage plus a predetermined portion of the difference between the anode voltage of the respective blocking diode of the other module and the anode voltage of its respective blocking diode, and a second operational amplifier, arranged subsequent to the first operational amplifier and supplying an output voltage equal to, depending on whether the sign of the difference between the anode voltages of the respective blocking diodes is negative or positive, either its respective reference voltage or the output voltage provided by said selection operational amplifier, the output voltage of said second operational amplifier being a corrected reference voltage for the module.

* * * * *